June 30, 1970    A. HELL    3,518,001
RADIANT ENERGY ANALYZER

Filed March 1, 1965    3 Sheets-Sheet 1

INVENTOR.
AUGUST HELL
BY
ATTORNEY

INVENTOR.
AUGUST HELL

United States Patent Office 3,518,001
Patented June 30, 1970

3,518,001
RADIANT ENERGY ANALYZER
August Hell, Whittier, Calif., assignor to Beckman
Instruments, Inc., a corporation of California
Filed Mar. 1, 1965, Ser. No. 435,911
Int. Cl. G01j 3/30
U.S. Cl. 356—87      13 Claims

ABSTRACT OF THE DISCLOSURE

There is disclosed a radiant energy analyzer particularly adapted for use in atomic absorption or flame emission measurements in which the number of radiation passes through a sampling area may be changed rapidly without the necessity of optical realignment. Two arrays of mirrors are located optically on opposite sides of the sampling area, one of the arrays being movable between discrete positions such that additional reflections across the sampling area are provided by the interposition of additional mirrors in each position. The movable array may also carry the source or detector for the system.

---

This invention relates generally to radiant energy analyzers and more particularly to an analyzer particularly adapted for atomic absorption or flame emission measurements in which the number of radiation passes through a sampling area may be changed rapidly without the necessity of optical realignment.

It is generally desirable in atomic absorption analysis to provide, in order to obtain strong absorption and hence high analytical sensitivity and accuracy, a long optical path through the sampling area. This may be achieved either by increasing the length of the sampling area or by providing multiple passes of the radiation through the sampling area. In atomic absorption analysis it has been the general practice to utilize either long narrow flames or a series of torch-like flames to generate the atomic vapor out of the sample. In this arrangement the sampling area is generally rectangular shaped being long and narrow. It is therefore highly desirable in such instruments to maintain the radiation beam as narrow as possible over a long distance and it is desirable that this beam property not be lost if one changes from a single pass through the sampling area to multiple passes.

Although atomic absorption spectrophotometers have been provided in the prior art which provide for changes in the number of passes through the sampling area, these devices have required the manual interposition of a mirroring system and require the precise optical alignment of the mirrors each time one changes the number of passes through the sampling area.

In emission spectroscopy, the free atoms of the sample are excited to a higher energy state and radiation is emitted at characteristic wavelengths. The line spectrum emitted by the sample is characteristic thereof and may be used for qualitative analysis while the intensity of the radiation can be correlated with the atomic population for quantitative analysis. The sensitivity of the analyzer can be increased by gathering radiation emitted in more than one direction from the sampling area and transmitting the energy along a common exit beam path. While this may require the transmission of the emitted energy back through the sampling area resulting in some absorption of this energy by the sample, an increase in energy still results thereby increasing the sensitivity of the analyzer.

It is, therefore, a principal object of the present invention to provide a radiant energy analyzer in which the number of passes of the radiation beam through the sampling area may be quickly and substantially instantaneously changed without requiring optical realignment.

Another object is to provide a radiant energy analyzer in which the number of beam passes through the sampling area may be changed without requiring optical realignment and in which the beam configuration remains substantially unchanged.

Still another object is the provision in a radiant energy analyzer of means for changing the number of passes of radiant energy through the sampling area without changing the image points of the beam along the optical axis.

Still another object is to provide an atomic absorption spectrophotometer in which the number of passes of radiant energy through the sample area may be substantially instantaneously changed either manually or automatically such that the sensitivity of the instrument can quicly be adjusted for various samples and the analytical range of the instrument for one sample can be readily expanded.

A further object of the present invention is to provide an atomic absorption spectrophotometer in which either one, three, five, etc., passes may be made by the radiant energy beam through the sample area and in which the change from one pass to multiple passes or between multiple passes may be carried out substantially instantaneously without the necessity of optically realigning the system.

Yet another object of the present invention is to provide a radiant energy analyzer which is readily adapted to either atomic absorption or flame emission spectroscopy and which provides for rapid selection of single or multiple beam passes through the sampling area without the necessity of optically realigning the system.

Other objects and many of the attendant advantages of this invention will become more readily appreciated as the same becomes better understood by reference to the following detailed description when considered in connection with the accompanying drawing in which like reference numerals designate like parts throughout the several figures thereof and wherein:

FIG. 1 diagrammatically illustrates the radiation beam bundle in the vicinity of the sampling area;

Figure 4:
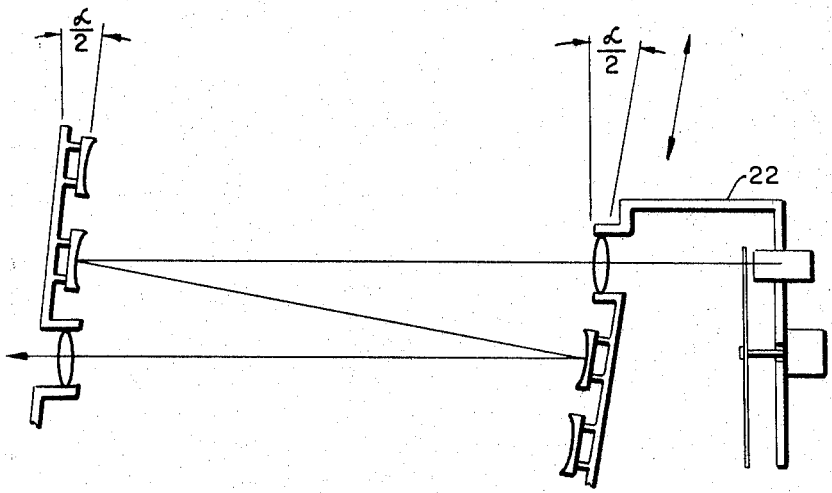
Figure 5:
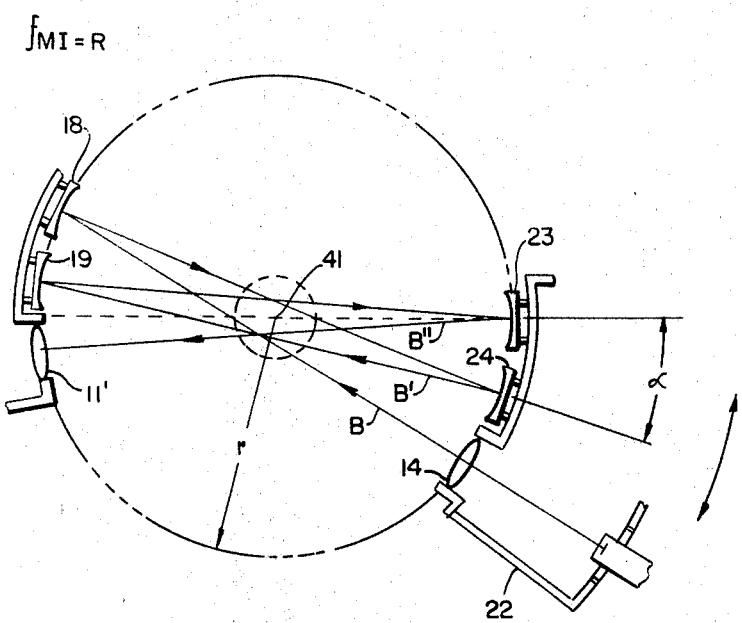

FIG. 4 illustrates a second preferred embodiment in which one, three or five radiant energy passes may be made through the sampling area and in which the radiation bundle remains unchanged when the number of passes change; and FIG. 5 illustrates still another embodiment of the present invention which provides for either single or multiple passes of the radiation beam through the sampling area and which may be utilized not only in atomic absorption spectroscopy but also in emission spectroscopy.

The photometric system to which this invention pertains generally will consist of a source, a sampling area, where interaction between radiation emitted by the source and the sample occurs in atomic absorption analysis or where the sample is excited in emission analysis, a wavelength discriminator and a radiation detector. The sampling area may be disposed either between the radiation source and the wavelength discriminator or between the discriminator and the detector. While the invention herein will be described in connection with a system in which the sampling area is located between the radiation source and the wavelength discriminator, it may in like manner be utilized between the discriminator and the detector.

Various wavelength discriminators are available and generally it is the discriminator which contains the limiting apertures of the system thus determining the useful radiation transmitting capacity of the system. The invention will be described herein in connection with one type of wavelength discriminator, a monochromator, and it is generally the practice to construct the system such that the dispersive element of the monochromator constitutes the system's limiting aperture. In the case of a monochromator, the dispersive element, the slit and the collimator focal length determine the radiation bundle that can be accepted. While the invention will be described herein in connection with a monochromator wherein its is presumed that the dispersive element of the monochromator forms the limiting aperture, it must be kept in mind that the invention is equally applicable to other systems wherein the source or the detector or some other optical element may constitute one of the limiting apertures. Particularly, in a system utilizing filters for wavelength discrimination, the filter and the detector or the filter and the source will generally represent the limiting aperture.

Figure 1:
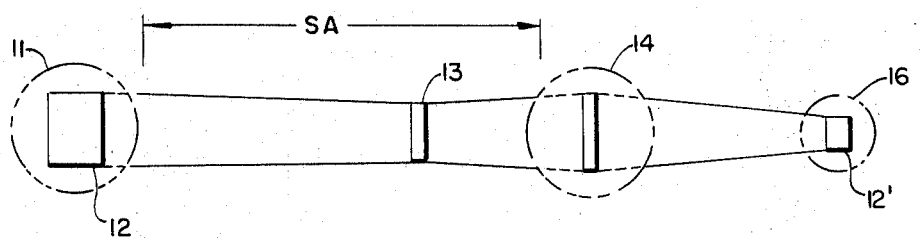

Referring now to FIG. 1 there is illustrated schematically various apertures within the system and the radiation bundle passing through the sampling area.

With optical elements not illustrated the dispersive element of the monochromator is imaged in an image plane 11, 12 representing the real image of the dispersive element. The slit image 13 of the monochromator is located in the vicinity of a lens 14 which re-images the dispersing element onto source 16 as image 12'. The dispersive element is truly one of the limiting apertures of the system if its image 12' on source 16 is smaller than the source. However, if desired, the system may be designed such that the dispersive element image 12' is larger than source 16 and in this case the source 16 will replace the dispersive element as a limiting aperture.

It is apparent that every ray passing the monochromator slit and defracted by the dispersive element also passes the slit image 13 and the dispersive element image 12, therefore, the useful radiation bundle lies within the wedge shape envelope of these two images. The space between the image plane 11 and lens 14 may be used as a sampling area and is indicated in the drawing by the distance SA. As has been previously pointed out it is the general practice in atomic absorption analysis to utilize long narrow flames or a series of torch-like flames to excite the sample. With this arrangement it is generally desirable to maintain the radiation beam through the sampling area as narrow as possible. If the image 13 of the monochromator slit is placed as close as possible to lens 14, the radiation beam through the sample area may be made relatively narrow. The relative placement of the slit image with respect to lens 14 is a matter of design consideration and it is illustrated in FIG. 1 displaced from lens 14 by a substantial amount since it is generally desirable to have the slit imaged within the flame of one of the burners if a multiple burner system is utilized or, within the flame of a single burner if only a single burner is used. The image plane 11 may lie within an optical lens and will be illustrated as such in the system hereafter described.

Figure 2:
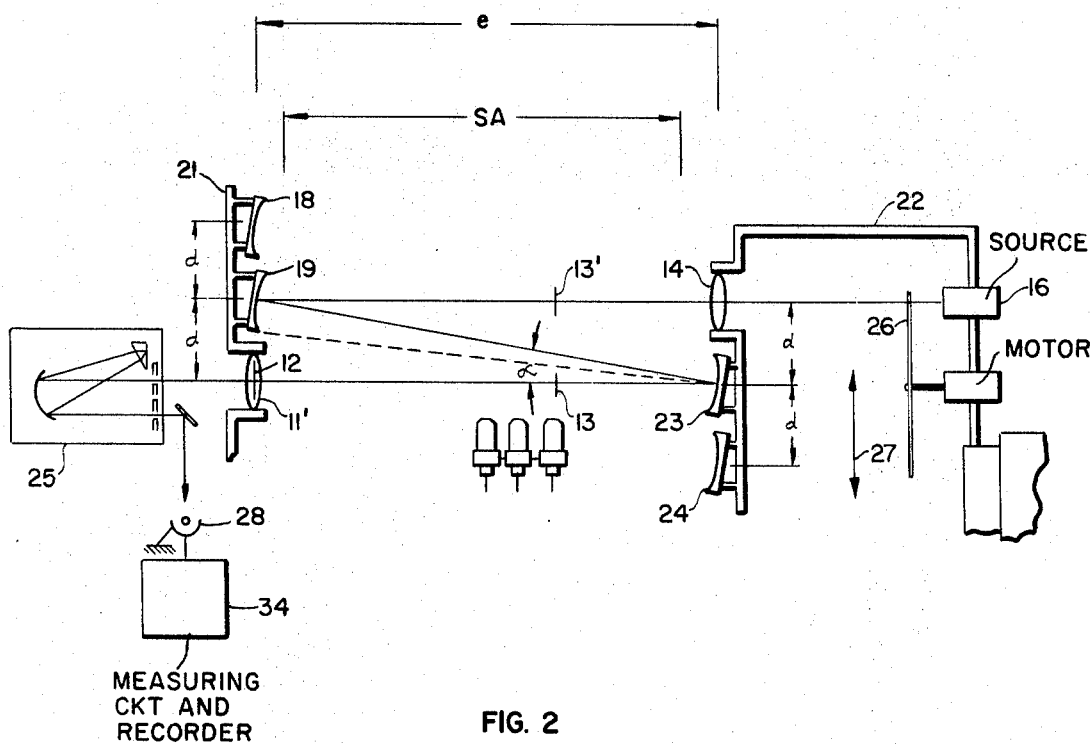
FIG. 2 illustrates one preferred embodiment of the present invention in which one, three or five passes may be made by the radiant energy through the sampling area and in which the number of passes may be conveniently selected without realignment of the instrument.

Bearing in mind the desired principles of the radiation bundle hereinbefore described and referring to FIG. 2, there is illustrated a system which allows the number of optical passes to be changed by simple linear motion, which may be carried out either manually or automatically, without the necessity of optical realignment of the system and which generally retains the desirable features of the radiation bundle just described for each pass. A first array of optical elements comprising lens 11' and mirrors 18 and 19 are rigidly affixed to a support member 21 which is immovable. Upon movable housing 22 is mounted a second optical array of fixed elements comprising lens 14, mirrors 23 and 24, source 16 and a motor driven chopper 26 if a chopper is required. The optical array mounted on support 21 is arranged in a common plane perpendicular to the exit beam path from the sampling area and, in the embodiment illustrated, are located in the image plane of the dispersing element image 12.

The optical array affixed to movable housing 22 are each located in a common plane parallel to the plane in which the first optical array is arranged and housing 22 may be moved in a direction parallel to this plane, as indicated by arrow 27, in increments of distance $d$ equal to the spacing between the lens 14 and mirror 23 and between mirrors 23 and 24. The spacing of lens 11' and mirrors 18 and 19 is likewise $d$. While the optical arrays are illustrated in this embodiment as being located physically on opposite sides of the sampling area SA it is only necessary that these arrays be located optically on opposite sides of the sampling area. That is, the support element 21 may be located on the same side of the sampling area as support 22 but to one side thereof such that radiation from one optical array passes the sampling area to the other optical array. This, of course, may be accomplished by folding the beam path around the sampling area by optical elements not illustrated. It should further be understood that lenses 11' and 14 are not critical to this system and may be omitted or may appear at other points in the optical train.

Radiation from the sampling area may be dispersed in a monochromator 25 and focused on a detector 28 mounted by any suitable means on the side of the sampling area optically opposite the source; detector 28 has its output connected to any suitable measuring and/or recording system 34, in a manner well known in the art.

With movable housing 22 in the position illustrated the radiation bundle or beam makes three passes through the sampling area SA. Mirror 23 re-images the dispersing element image 12 onto mirror 19 and lens 14 forms a further image of the dispersing element onto source 16. Mirror 19 also re-images the slit image 13 at 13' at a distance from mirror 19 equal to the distance between lens 11' lying in the image plane 11 and the image 13. It is apparent that by lowering housing 22 a distance $d$ a single beam pass from source 16 through lenses 14 and 11' is made through the sampling area and that by raising the assembly a distance $d$ from that illustrated five passes are provided through the sampling area. In the latter instance radiation passing lens 14 is reflected by mirror 18 to mirror 23 and radiation reflected by mirror 23 passes to mirror 19 and reflected thereby to mirror 24 which reflects the radiation through lens 11'. It is apparent that providing additional mirrors, seven or any odd number of passes may be made through the sampling area. It is further obvious from the above description that by proper selection of the focal length of mirrors 18, 19, 23 and 24 the system stays in focus regardless of the number of passes made through the sampling area. Further, as pointed out in more detail hereinafter, no significant magnification of the images occurs. The position of the source 16 (with chopper 26) and the detector 28 may be reversed without affecting the imagery or operation of the system.

In each of the foregoing cases, the dispersive element is imaged on source 16 or reversing the beam and following the actual direction of the radiation, it is apparent that the source is always imaged onto the dispersing element. The invention provides for rapid transfer from single to multiple passes and since only linear motion of assembly 22 is required, the raising and lowering mechanism is uncomplicated. The imaging in the system is performed in such a manner that the radiation beam in each pass, whether single pass or multiple pass, has the narrow wedge-shape form described in FIG. 1 which lends itself for utilization with narrow but fairly long and high sample areas which are typically generated by flames utilized in atomic absorption and flame emission analysis.

Figure 3:
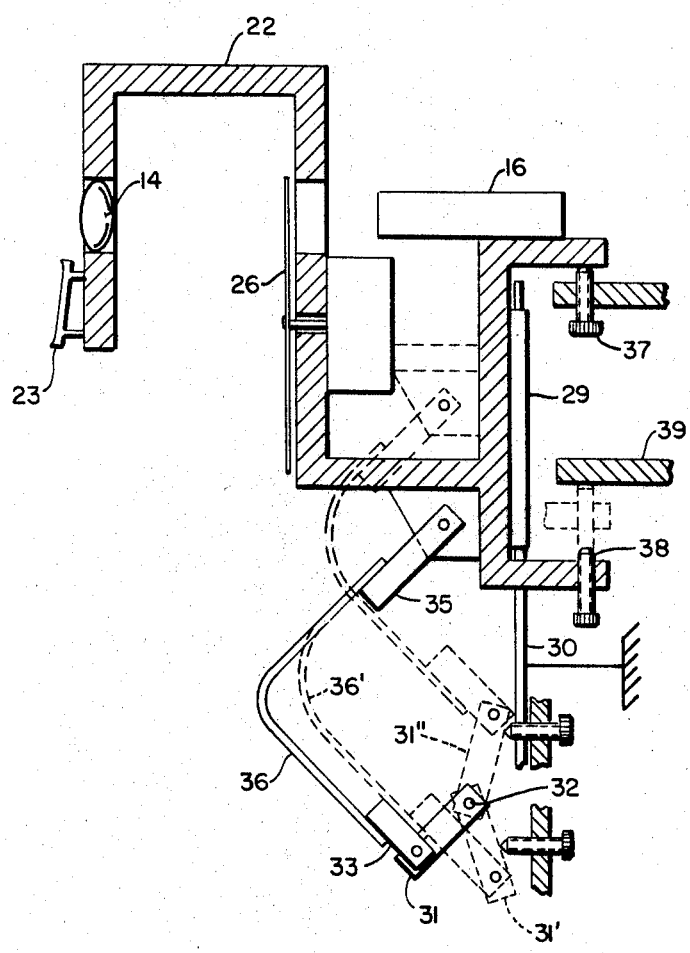
FIG. 3 illustrates one preferred embodiment of a mechanical mechanism for positioning the embodiment of FIG. 2 to provide single or multiple passes through the sampling area.

Referring now to FIG. 3 there is illustrated an assembly which may provide either one or three radiation passes through the sampling area and illustrates a simple, yet accurate and reliable switching mechanism for raising and lowering assembly 22. Assembly 22 contains lens 14, source 16, mirror 23 and motor driven chopper 26. Source 16 may be supported on the assembly in any suitable manner. The assembly has a U-shaped slide 29 affixed thereto which engages and slides along a rail 30 that is rigidly affixed to the instrument. A raising and lowering mechanism has a first linkage bar 31 affixed to rotatable shaft 32 which may be turned either manually by a crank or automatically rotated by a motor drive mechanism. A second linkage bar 33 is movably pinned to bar 31 and a third linkage bar 35 is rotatably pinned to assembly 22. Linkage bars 33 and 35 are connected by a flexible spring steel link 36. In the position illustrated the assembly rests against an adjustable stop screw 37 which determines its lowermost position and may be rigidly locked against screw 37 by rotating shaft 32 clockwise to the position illustrated in phantom at 31' thus flexing the spring steel member 36 to position 36'. The assembly may be raised along slide 30 by rotating shaft 32 clockwise and locking linkage bar 31 against a second stop as illustrated in position 31''. It is obvious that in so doing the assembly is raised and assumes a new position illustrated in phantom with adjustable stop screw 38 resting against stop 39. Thus, by rotating shaft 32 clockwise the source, lens 14 and mirror 23 may be raised a distance $d$ to provide a triple pass beam through the sampling area. It is apparent that other multistop mechanisms may be readily provided and the two position mechanism illustrated in FIG. 3 is illustrated merely by way of example and not by way of limitation.

Referring again to FIG. 2, the linear movement of the system will be analyzed in greater detail. The central ray of the radiation bundle of FIG. 1 has been illustrated as the solid line in the figure and it is apparent that the first, third and fifth paths of the beam are horizontal while the even numbered passes form an angle $\alpha$ with the horizontal. The tangent of the angle $\alpha$ is equal to $$\tan \alpha = \frac{d}{e} \qquad (1)$$

where $d$ is the distance between the centers of adjacent optical elements and $e$ is the path length from elements 11', 18 and 19 and elements 14, 23 and 24. The arrangement of FIG. 2 wherein the motion of assembly 22 is linear is preferred from the mechanical standpoint since the first beam pass and the final beam pass are horizontal and allow horizontal mounting of source 16 and lenses 11' and 14. The mirrors and lenses are arranged vertically and the motion of assembly 22 is also vertical. However, there is a slight difference in path length between the odd numbered beam passes and the even numbered passes which requires that the focal length of mirrors 23 and 24 be not exactly $e/2$ but to a first approximation:

$$f_{23,24} = \frac{e}{2}\left[1 + \frac{1}{4}\left(\frac{d}{e}\right)^2\right] \qquad (2)$$

If mirrors 18 and 19 are identical to mirrors 23 and 24, the slit image will move a small amount with each pass in a direction toward lens 14. The dispersing element image 12 and thus the image of the dispersing element on source 16 will be slightly magnified with each two passes, the linear magnification factor for the image 12' at the source being approximately $$m = \left[\left\{1 + \left(\frac{d}{e}\right)^2\right\}^{1/2}\right]^{\frac{n-1}{2}} \qquad (3)$$

where $n$ is the number of passes. Since $d < e$ Equation 3 reduces, to a first approximation, from $$m = 1 + \frac{n-1}{4}\left(\frac{d}{e}\right)^2 + \left[\frac{(n-1)(n-5)}{32}\left(\frac{d}{e}\right)^4 + \cdots\right] \qquad (4)$$

to:

$$m = 1 + \frac{n-1}{4}\left(\frac{d}{e}\right)^2 \qquad (5)$$

It may be seen from Equation 5 that although the system remains in focus when the number of passes change, the radiation bundle does not remain exactly the same. The radiation bundle increases slightly in width close to the array of fixed optical elements 11', 18 and 19 and narrows close to the array of movable optical elements 14, 23 and 24. Further, since the size of the dispersing element image 12' at the source increases with each subsequent pass the source, rather than the dispersing element, could eventually become the limiting aperture and for any further pass after this there would be a slight decrease in radiant energy.

For most practical applications, the number of passes will be limited by the size of the actual sampling area or, in the case of burners, by the flame area, to three or five passes and the change in the useful radiation bundle is negligible. For example, for five passes where $d$ is 2 cm. and $e$ is 10 cm., i.e., tan $\alpha = 0.2$, the radiation beam bundle width increases by only 4%. Thus, for most practical applications wherein the multiple pass is limited to three or five passes, the structural benefits hereinbefore disclosed in connection with the arrangement wherein linear motion is utilized, can be obtained without significant compromise of performance of the analytical instrument. It is to be understood, that this approach, wherein the beam size varies slightly with change in the number of beam passes through the sampling area, constitutes a part of this invention as well as the ideal approaches disclosed hereinafter in which the beam bundle remains the same, disregarding aberrations, irrespective of the number of passes. It should be further understood that the optical array on support 21 need not be located in the plane of an image of the dispersing element but may be located otherwise with proper location of the other array and appropriate adjustment of the focal length of the mirrored elements.

In FIG. 4 the system is arranged in such a manner that the arrays of optical elements lie along an axis of a plane tilted from the vertical by an angle $\alpha/2$ and the motion of assembly 22 is likewise at an angle $\alpha/2$ with the vertical. In this manner, the difference in path length of the odd and even numbered passes as described in connection with FIG. 2 is eliminated. Alternatively, though not illustrated, it is also possible to construct the array of optical elements at an angle $\alpha/2$ to the vertical and maintain the motion of assembly 22 linear and in the vertical plane; however, the radiation leaving the source and the rays passing lens 11 are tilted by an angle $\alpha/2$ from a horizontal plane.

Referring now to FIG. 5 there is illustrated another embodiment of the present invention which can be utilized where the sampling area has a more limited height and compact shape. In this embodiment, both optical arrays are assembled in a horizontal plane, leness 11' and 14 and mirrors 18, 19, 23 and 24 being mounted about a circle having its center at 41 and a radius $r$. Elements 11', 18 and 19 are fixed and assembly 22 is rotatable about the center 41. The assembly is illustrated in the position for five radiation passes through the sampling area which may be at the center of the circle. By rotating the assembly counterclockwise through angles $\alpha$ and $2\alpha$ three passes and one pass may be made through the sampling area.

The mechanical problems associated with rotational movement are even simpler than those associated with linear movement. The number of passes in the embodiment of FIG. 5 can be readily changed without optical realignment. The radiation beams are maintained in focus and maintain their shape regardless of the number of passes made through the sampling area. The wedge-shape form of the beams in this embodiment are laid side by side allowing an even closer spacing of the mirrors and a more concentrated sampling area can be achieved than in the system providing linear motion.

It is apparent that each of the embodiments of FIGS. 2, 4 and 5 may be utilized not only for atomic absorption analysis but may also be utilized to advantage for emission analysis where the flame or the discharge, constituting the source for the system, is placed in the sampling area. In this instance the lens 14 may be replaced by a third mirror to reflect radiation from the source back onto the source and mirror 18.

It is apparent from the foregoing disclosure of the present invention that the apparatus may be made in the form of an attachment for spectrophotometric analyzers. Thus, a single monochromator and the associated electronic equipment may be utilized not only for conventional spectroscopy but also for atomic absorption and flame emission measurements when combined with the features of the present invention constructed in the form of an accessory. There has been illustrated and described apparatus for providing one or a multiple of radiation beam paths through a sampling area in which the number of passes of the beam may be quickly and substantially instantaneously changed without requiring optical realignment of the system. The instrument remains in focus whether a single pass or multiple passes are made through the sampling area and the beam configuration remains substantially unchanged.

What is claimed is:

1. a radiant energy analyzer comprising:
a radiant energy source;
a radiant energy detector;
a sampling area;
mounting means mounting said source optically on one side of said sampling area;
mounting means mounting said detector optically on the other side of said sampling area;
one of said mounting means being movable between at least first and second positions;
a first radiation beam path from said source through said sampling area to said detector when said movable mounting means is in said first position to provide a single radiation beam path through said sampling area;
first radiation reflecting means mounted on said movable mounting means;
second radiation reflecting means mounted on a side of said sampling area optically opposite said fisrt reflecting means;
a second radiation beam path from said source through said sampling area to said detector and including said first and second reflecting means when said movable mounting means is in said second position to provide at least three radiation beam passes through said sampling area.

2. A radiant energy analyzer comprising:
a radiant energy source;
a radiant energy detector;
a sampling area;
mounting means mounting said source optically on one side of said sampling area;
mounting means mounting said detector optically on the other side of said sampling area;
one of said mounting means being movable between at least first and second positions;
a first radiant beam path from said source through said sampling area to said detector when said movable mounting means is in said first position to provide a single radiation beam path through said sampling area;
first radiation reflecting means mounted on said movable mounting means;
second radiation reflecting means mounted on a side of said sampling area optically opposite said first reflecting means;
a second radiation beam path from said source through said sampling area to said detector including said first and second reflecting means when said movable mounting means is in said second position to provide at least three radiation beam passes through said sampling area;
the focal length of said first and second radiation reflecting means being substantially identical and providing said three radiation beam passes through said sampling area without significant magnification and without significant change in the entrance beam to and the exit beam from said sampling area.

3. A radiant energy analyzer comprising:
a radiant energy source;
a radiant energy detector;
a sampling area;
mounting means mounting said source optically on one side of said sampling area;
mounting means mounting said detector optically on the other side of said sampling area;
one of said mounting means being movable between at least first and second positions;
a first radiation beam path from said source through said sampling area to said detector when said movable mounting means is in said first position to provide a single radiation beam path through said sampling area;
said beam path having an image in at least one image plane displaced to one side of said sampling area;
first radiation reflecting means mounted on said movable mounting means;
second radiation reflecting means mounted on a side of said sampling area optically opposite said first reflecting means;
one of said reflecting means being mounted in said image plane and displaced from said first radiation beam path;
a second radiation beam path from said source through said sampling area to said detector including said first and second reflecting means when said movable mounting means is in said second position to provide at least three radiation beam passes through said sampling area;
the focal length of said first and second reflecting means being substantially identical and providing a re-imaging of said image in said image plane without significant magnification thereof.

4. A radiant energy analyzer for use in emission or absorption spectroscopy comprising:
a sampling area;
a radiant energy detector;
sample excitation means mounted in said sampling area;
first radiation reflecting means mounted optically on one side of said sampling area;
second radiation reflecting means mounted optically on the other side of said sampling area;
means for moving said second radiation reflecting means between at least first and second positions;
a radiation beam path from said sampling area to said detector when said second reflecting means is in said first position;
a second radiation beam path from said sampling area to said detector and including said first and second reflecting means when said second reflecting means is in said second position.

5. A radiant energy analyzer for use in emission or absorption spectroscopy comprising:
a sampling area;

a radiant energy detector;
sample excitation means mounted in said sampling area;
first radiation reflecting means mounted optically on one side of said sampling area;
second radiation reflecting means mounted optically on the other side of said sampling area;
means for moving one of said radiation reflecting means between at least first and second positions;
a radiation beam path from said sampling area to said detector when said second reflecting means is in said first position;
said first and second reflecting means reflecting radiation from said sampling area along said radiation path from said sampling area to said detector when said first and second reflecting means is in said second position.

6. A radiant energy analyzer comprising:
a radiant energy source;
a radiant energy detector;
a sampling area;
movable mounting means mounting said source optically on one side of said sampling area;
first radiation reflecting means mounted optically on the other side of said sampling area;
second radiation reflecting means mounted on said movable mounting means;
means for moving said movable mounting means between at least first and second positions;
a first radiation path from said source through said sampling area to said detector when said mounting means is in said first position to provide at least a single radiation path through said sampling area;
a second radiation beam path from said source through said sampling area to said first reflecting means, from said first reflecting means through said sampling area to said second reflecting means and from said second reflecting means through said sampling area to said detector when said movable mounting means is in said second position to provide at least three radiation beam passes through said sampling area.

7. A radiant energy analyzer comprising:
a radiant energy source;
a radiant energy detector;
a sampling area;
movable mounting means mounting said detector on one side of said sampling area;
means for moving said movable mounting means between at least first and second positions;
first radiation reflecting means mounted on said movable mounting means;
second radiation reflecting means mounted on the other side of said sampling area;
a radiation beam path from said source through said sampling area to said detector when said movable mounting means is in said first position to provide at least a single radiation beam path through said sampling area;
a second radiation beam path from said source through said sampling area to said first radiation reflecting means, from said first radiation reflecting means through said sampling area to said second radiation reflecting means, and from said second radiation reflecting means through said sampling area to said detector when said movable mounting means is in said second position thereby to provide an increased radiation path length through said sampling area.

8. A radiant energy analyzer comprising:
a radiant energy source;
a radiant energy detector;
a sampling area;
first mounting means mounting said source optically on one side of said sampling area;
second mounting means mounting said detector optically on the other side of said sampling area;
means for moving said first mounting means selectively through a plurality of discrete displacements to provide $n$ discrete positions;
a first optical array including $(n-1)$ reflecting means mounted on said source mounting means and movable therewith;
a second optical array including $(n-1)$ reflecting means mounted on a side of said sampling area optically opposite said first optical array;
a first radiation beam path from said source through said sampling area to said detector when said movable mounting means is in one of its discrete positions;
a second radiation beam path from said source through said sampling area to said detector when said movable mounting means is in one of its discrete positions; said radiation beam path including successive ones of said reflecting means in said first and second optical arrays as said movable mounting means is moved to successive positions whereby the optical path length through said sampling area is increased by a factor of $(2n-1)$ where $n$ is the number of positions of said movable mounting means.

9. A radiant energy analyzer comprising:
a radiant energy source;
a radiant energy detector;
a sampling area;
movable mounting means mounting said source optically on one side of said sampling area;
mounting means mounting said detector optically on the other side of said sampling area;
means for moving said movable mounting means between $n$ number of positions separated by like, discrete distances;
first radiation reflecting means mounted on said movable mounting means, said radiation reflecting means including at least $n-1$ reflecting elements each separated by said discrete distance;
second radiation reflecting means mounted on a side of said sampling area optically opposite said first reflecting means, said second radiation reflecting means including at least $n-1$ reflecting elements each separated by said discrete distances;
a radiation beam path from said source through said sampling area to said detector when said movable mounting means is in a first of said positions;
a second radiation path from said source through said sampling area to said detector including successive ones of said reflecting elements in successive positions of said movable mounting means whereby the number of beam passes through said sampling area is increased by two for each successive position of said movable mounting means.

10. The radiant energy analyzer of claim 9 wherein:
said first radiation beam path from said source through said sampling area to said detector has an image in at least one image plane displaced to one side of said sampling area;
one of said radiation reflecting means being mounted in the plane of said image and each of said reflecting elements having a like focal length to provide a re-imaging of said image in said image plane without significant magnification thereof.

11. A radiant energy analyzer comprising:
a radiant energy source;
a radiant energy detector;
a sampling area;
mounting means mounting said source optically on one side of said sampling area;
mounting means mounting said detector optically on the other side of said sampling area;
one of said mounting means being movable between at least first and second positions;
wavelength discrimination means;
a first radiation beam path from said source through said sampling area to said detector and including said wavelength discrimination means when said movable mounting means is in said first position to provide a single radiation beam path through said sampling area;
first radiation reflecting means mounted on said movable mounting means;
second radiation reflecting means mounted on a side of said sample optically opposite said first reflecting means;
a second radiation beam path from said source through said sampling area to said detector and including said first and second reflecting means and said wavelength discriminating means when said movable mounting means is in said second position to provide at least three radiation beam passes through said sampling area.

12. A radiant energy analyzer for use in emission or absorption spectroscopy comprising:
a sampling area;
a wavelength discriminator;
a radiant energy detector;
sampling excitation means mounted in said sampling area;
a first radiation reflecting means mounted optically on one side of said sampling area;
second radiation reflecting means mounted optically on the other side of said sampling area;
means for moving said second radiation reflecting means between at least first and second positions;
a radiation beam path from said sampling area to said detector and including said wavelength discriminating means when said second reflecting means is in said first position;
a second radiation beam path from said sampling area to said detector and including said wavelength discriminating means and said first and second reflecting means when said second reflecting means is in said second position.

13. A radiant energy analyzer comprising:
a radiant energy source;
a radiant energy detector;
a radiant energy discriminating means;
a sampling area;
movable means mounting said source optically on one side of said sampling area;
first radiation reflecting means mounted optically on the other side of said sampling area;
second radiation reflecting means mounted on said movable mounting means;
means for moving said movable mounting means between at least first and second positions;
a first radiation path from said source through said sampling area and said wavelength discriminating means to said detector when said mounting means is in said first position to provide at least a single radiation path through said sampling area;
a second radiation beam path from said source through said sampling area to said reflecting means, from said first reflecting means through said sampling area to said second reflecting means and from said second reflecting means through said sampling area and said wavelength discriminating means to said detector when said movable mounting means is in said second position to provide at least three radiation beam passes through said sampling area.

References Cited

UNITED STATES PATENTS

| | | |
|---|---|---|
| 2,212,211 | 8/1940 | Pfund. |
| 2,743,646 | 5/1956 | Strong. |
| 3,066,576 | 12/1962 | Clorfeine _____ 350—299 X |
| 3,080,789 | 3/1963 | Rosin et al. |
| 3,218,914 | 11/1965 | Bartz et al. _____ 250—43.5 X |
| 3,319,071 | 5/1967 | Werth et al. |

FOREIGN PATENTS 584,506   1/1947   Great Britain.

OTHER REFERENCES

Jarrell-Ash Catalogue No. 82—362, September 1964, pages 1–8.

RONALD L. WIBERT, Primary Examiner

F. L. EVANS, Assistant Examiner

U.S. Cl. X.R.

250—218; 350—299; 356—201, 244